(12) United States Patent
McCarthy et al.

(10) Patent No.: US 10,579,957 B1
(45) Date of Patent: Mar. 3, 2020

(54) SYSTEM AND METHOD FOR STORING AND DISPLAYING RETURNED GOODS INFORMATION

(75) Inventors: Sean McCarthy, Frisco, TX (US); Andrew Francis Robbins, Winston-Salem, NC (US); Kevin Reece Goode, Clemmons, NC (US)

(73) Assignee: INMAR SUPPLY CHAIN SOLUTIONS, LLC, Winston-Salem, NC (US)

( * ) Notice: Subject to any disclaimer, the term of this patent is extended or adjusted under 35 U.S.C. 154(b) by 957 days.

(21) Appl. No.: 12/533,589

(22) Filed: Jul. 31, 2009

(51) Int. Cl.
| | |
|---|---|
| *G06F 19/00* | (2018.01) |
| *G06Q 10/08* | (2012.01) |
| *G06Q 30/00* | (2012.01) |
| *G06Q 30/06* | (2012.01) |
| *G06Q 20/20* | (2012.01) |
| *G06Q 30/02* | (2012.01) |

(52) U.S. Cl.
CPC ......... *G06Q 10/087* (2013.01); *G06Q 30/016* (2013.01); *G06Q 20/202* (2013.01); *G06Q 30/0238* (2013.01); *G06Q 30/06* (2013.01)

(58) Field of Classification Search
CPC .............................. G06Q 10/087; G06Q 30/02
USPC ......................................... 705/28; 707/104.1
See application file for complete search history.

(56) References Cited

U.S. PATENT DOCUMENTS

| | | | |
|---|---|---|---|
| 6,085,172 A * | 7/2000 | Junger ................. | G06Q 10/083 705/28 |
| 6,536,659 B1 | 3/2003 | Hauser | |
| 6,754,637 B1 | 6/2004 | Stenz | |
| 6,832,263 B2 | 12/2004 | Polizzi et al. | |
| 6,834,268 B2 | 12/2004 | Junger | |
| 7,024,431 B1 * | 4/2006 | Kornelson ............ | G06F 16/254 |

(Continued)

FOREIGN PATENT DOCUMENTS

GB    2397663 A    7/2004

OTHER PUBLICATIONS

Business/Technology Editors, "Returns Management Solutions Provider Swift Rivers, Inc. Raises $3.6 Million in Series B Financing," Business Wire, New York, Dec. 5, 2001, p. 1.

(Continued)

*Primary Examiner* — Talia F Crawley
(74) *Attorney, Agent, or Firm* — Allen, Dyer, Doppelt + Gilchrist, P.A.

(57) ABSTRACT

A system, a method, and computer readable medium for storing and displaying user-selected returned goods information for a retailer having a plurality of stores and a plurality of vendors. The system, method and computer readable medium includes a computer database of returned goods information for a retailer having a plurality of stores and a plurality of vendors. A user interface receives at least one condition for displaying user-selected returned goods information for one or more of the plurality of stores or one or more of the plurality of vendors. The system, method and computer readable medium determines whether the condition for displaying the returned goods information is satisfied for each of the plurality of stores and each of the plurality of vendors. The system, method and computer readable medium displays returned goods information for which the condition is met for each of the plurality of stores and each of the plurality of vendors.

14 Claims, 17 Drawing Sheets

(56) References Cited

U.S. PATENT DOCUMENTS

| | | | |
|---|---|---|---|
| 7,050,995 B2 | 5/2006 | Wojcik et al. | |
| 7,124,941 B1 | 10/2006 | OConnell | |
| 7,376,572 B2 | 5/2008 | Siegel | |
| 7,428,988 B1* | 9/2008 | Starr | G06Q 30/06 235/383 |
| 7,455,226 B1* | 11/2008 | Hammond | G06Q 10/087 235/385 |
| 7,912,773 B1* | 3/2011 | Subramanian | G06Q 10/04 705/35 |
| 8,032,409 B1 | 10/2011 | Mikurak | |
| 2001/0037207 A1* | 11/2001 | Dejaeger | G06Q 20/10 705/39 |
| 2001/0047315 A1 | 11/2001 | Siegel | |
| 2002/0019785 A1* | 2/2002 | Whitman | G06Q 10/087 705/28 |
| 2003/0110088 A1 | 6/2003 | Starmer et al. | |
| 2003/0225625 A1 | 12/2003 | Chew et al. | |
| 2004/0088225 A1* | 5/2004 | Foth | G06Q 30/06 705/26.41 |
| 2004/0143517 A1 | 7/2004 | Tsai | |
| 2004/0143518 A1 | 7/2004 | Siegel | |
| 2004/0225745 A1* | 11/2004 | Carroll | H04L 29/06 709/231 |
| 2005/0015315 A1 | 1/2005 | Starkowsky | |
| 2005/0080635 A1 | 4/2005 | Groff et al. | |
| 2005/0216368 A1 | 9/2005 | Wechsel | |
| 2005/0222911 A1 | 10/2005 | Kerker et al. | |
| 2005/0283463 A1 | 12/2005 | Dill et al. | |
| 2006/0149577 A1 | 7/2006 | Stashluk et al. | |
| 2006/0277110 A1 | 12/2006 | Witter | |
| 2007/0239569 A1 | 10/2007 | Lucas et al. | |
| 2007/0282743 A1 | 12/2007 | Lovelett | |
| 2008/0154677 A1 | 6/2008 | Casey | |
| 2008/0222001 A1 | 9/2008 | Kunieda et al. | |
| 2009/0076870 A1 | 3/2009 | Hammond et al. | |
| 2009/0112927 A1* | 4/2009 | Chitnis | G06Q 10/087 |
| 2009/0138562 A1* | 5/2009 | Schmulen | G06Q 10/107 709/206 |
| 2009/0281935 A1 | 11/2009 | Junger | |
| 2010/0312884 A1* | 12/2010 | Nandy | G06Q 30/02 709/224 |

OTHER PUBLICATIONS

ModusLink Global Solutions, Inc., Hoover's Company Records, Austin: Jun. 15, 2009., Iss. Mm-Mz; p. 16748.

Information about Related Patents and Patent Applications, see the section of the accompanying Information Disclosure Statement Letter entitled "Related Patents and Patent Applications" for further information.

* cited by examiner

Watch Sources — 194

WATCH SOURCES SETTINGS

SOURCE RETURNS — 270

210 — ☑ RETURNS > [120% ▼] OF AVG SOURCE RETURNS

215 — ☑ SOURCES WITH NO RETURN ACTIVITY FOR PERIOD

MY SOURCES

AVAILABLE SOURCES | SOURCES TO WATCH

[Enter Source #] [Add »]

OR CHOOSE FROM LIST:
1
10
100
1000
1001
1002

220 — BY FILTERS

[<select> ▼] [> ▼] [5% ▼] OF TOTAL RETURNS [Add »] — 221

B [<select> ▼
Non-Creditable
Billable
Non-Billable
Private Label
Non-Private Label
Discontinued
Non-Discontinued
ARP
Non-ARP
Creditable] [> ▼] [5% ▼] OF TOTAL RETURNS [Add »]

B [ ▼] [> ▼] [5% ▼] OF TOTAL RETURNS [Add »]

MY CONTROLLED RETURNS — 280

AVAILABLE CONTROLLED RETURNS | CONTROLLED RETURNS TO WATCH

[Enter Controlled Retu] [Add »]

OR CHOOSE FROM LIST:
RCL 0009
RCL 0013
RCL-0021
RCL00008
RCL0001
RCL0002

[Save] [Cancel]

*FIG. 7B*

Watch Sources — 194

WATCH SOURCES SETTINGS

SOURCE RETURNS

☑ RETURNS > [120% ˅] OF AVG SOURCE RETURNS

☑ SOURCES WITH NO RETURN ACTIVITY FOR PERIOD

BY FILTERS
<select>
--All Dispositions--
Dairy
Deli

BY Store Equip
Store Exp
Store Supplies
Supplies-57

BY Cigarettes
Bakery

[ ˅ ] > [5% ˅] OF TOTAL RETURNS [Add»]

[ ˅ ] > [5% ˅] OF TOTAL RETURNS [Add»] — 231

Dairy [ ˅ ] > [5% ˅] OF TOTAL RETURNS [Add»]

— 230

MY SOURCES — 270

AVAILABLE SOURCES          SOURCES TO WATCH

[Enter Source #] [Add»]

OR CHOOSE FROM LIST
1
10
100
1000
1001
1002

»
«

MY CONTROLLED RETURNS — 280    CONTROLLED RETURNS TO WATCH

AVAILABLE CONTROLLED RETURNS

[Enter Controlled Retu] [Add»]

OR CHOOSE FROM LIST
RCL 0009
RCL 0013
RCL-0021
RCL00008
RCL0001
RCL0002

»
«

[Save] [Cancel]

*FIG. 7C*

Watch Sources

WATCH SOURCES SETTINGS

SOURCE RETURNS

☑ <select> --All Dispositions-- | % | ▼ | OF AVG SOURCE RETURNS
☑ CENTER OPTION | | | O RETURN ACTIVITY FOR PERIOD
   CHOICE-HOLD FOR VEN
   Destroy Special
BY DONATE
   DRS-HOLD FOR VEND
☐ HOLD FOR VENDOR REV | > | 5% | ▼ | OF TOTAL RETURNS [Add»]
   HOLD FOR VENDOR REV
BY HOLD FOR VENDOR REV
   HOLD FOR VENDOR REV
☐ HOLDNC | > | 5% | ▼ | OF TOTAL RETURNS [Add»]
   HOLDSC
BY PNTB
   SHIP THE PRODUCT
☐ <select> | > | 5% | ▼ | OF TOTAL RETURNS [Add»]
   DESTROY

— 240    — 241

MY SOURCES — 270

| AVAILABLE SOURCES | | SOURCES TO WATCH |
|---|---|---|
| Enter Source # [Add»] | | |
| OR CHOOSE FROM LIST | | |
| 1 | | |
| 10 | » | |
| 100 | « | |
| 1000 | | |
| 1001 | | |
| 1002 | | |

MY CONTROLLED RETURNS — 280

| AVAILABLE CONTROLLED RETURNS | | CONTROLLED RETURNS TO WATCH |
|---|---|---|
| Enter Controlled Retu [Add»] | | |
| OR CHOOSE FROM LIST | | |
| RCL 0009 | » | |
| RCL 0013 | « | |
| RCL-0021 | | |
| RCL00008 | | |
| RCL0001 | | |
| RCL0002 | | |

[Save] [Cancel]

Watch Vendors

__WATCH VENDOR SETTINGS__

VENDOR RETURNS

☑ BILLING AMOUNT > [110%] ▾ OF TOTAL INVOICE COSTS — 411
☐ SOURCES WITH NO RETURN ACTIVITY FOR PERIOD — 415

BY FILTERS
[<select>] ▾ [>] [5%] ▾ OF TOTAL RETURNS [Add »] — 421

BY DISPOSITION
[<select>] ▾ [>] [5%] ▾ OF TOTAL RETURNS [Add »] — 441

MY VENDORS — 470

AVAILABLE VENDORS | VENDORS TO WATCH
[Enter Vendor Code] [Add »]
OR CHOOSE FROM LIST
(HAR) PERMER (MELROSE)_(D00A
(HAR) ST JOHN BEV (D00D845C)
--ALL VENDORS--
02-COOL, LLC (32662C)
21 CENTURY PRODUCE (D00V666C)
21ST CENTURY SUPPLY (99629C)

»
«

[Save] [Cancel]

Watch Vendors

WATCH VENDOR SETTINGS

VENDOR RETURNS

☑ BILLING AMOUNT > [110% ▾] OF TOTAL INVOICE COSTS — 411

☑ SOURCES WITH NO RETURN ACTIVITY FOR PERIOD — 415

BY FILTERS — 420

[Creditable ▾] [> ▾] [5% ▾] OF TOTAL RETURNS [Add »] — 421

[<select> ▾]
 <select>
 Creditable
 Non-Creditable
 Billable
 Non-Billable
 Private Label
 Non-Private Label
 Discontinued
 Non-Discontinued
 ARP
 Non-ARP BY [ ] [> ▾] [5% ▾] OF TOTAL RETURNS [Add »]

MY VENDORS — 470

AVAILABLE VENDORS | VENDORS TO WATCH

[Enter Vendor Code] [Add »]

OR CHOOSE FROM LIST
(HAR) PERMER (MELROSE) (D00A
(HAR) ST JOHN BEV (D00D845C)
--ALL VENDORS--
02-COOL, LLC (32662C)
21 CENTURY PRODUCE (D00V666C)
21ST CENTURY SUPPLY (99629C)

» «

[Save] [Cancel]

Source View Processed Summary - Windows Internet Explorer — 197 http://uat-sqlicerpweb/CLSReturnsPro/ICEC/SourceView/ProcessedSummary.aspx

File Edit View Favorites Tools Help

Source View - Pro...

Home Returns ▽ Sources ▽ Vendors ▽ Controlled Returns ▽ Reporting ▽

Source View

Joe Doe | Logout
A1 Grocery - All Programs | Change — 100

REGION: A1 GROCERY PERIOD: MONTH 04 — 130

| SOURCE 055335 | | |
|---|---|---|
| Address | Contact | Phone |
| 406 5TH AVENUE TROY, NY 12182 | eMail | |

| Processed Summary | Returns By Dept | Returns By Disposition | Returns By Vendor | Controlled Returns | Boxes |

Filter by Return Attributes>

| | PROCESSED | | CREDITABLE | | | NON-CREDITABLE | | | VENDOR INVOICES | | | | All Periods |
|---|---|---|---|---|---|---|---|---|---|---|---|---|---|
| CREDIT PERIOD | UNITS | AVG | UNITS | AMOUNT | %TTL | UNITS | %TTL | AMOUNT | HANDLING | TOTAL INVOICED | INV/SC VAR AMOUNT | AVG SOURCE CREDIT PER ITEM |
| MONTH 01 | 4 | | 0 | $0.00 | 0.00% | 4 | 100.00% | $0.00 | $0.00 | $0.00 | $0.00 | $0.00 |
| MONTH 04 | 7 | | 0 | $0.00 | 0.00% | 7 | 100.00% | $0.00 | $0.00 | $0.00 | $0.00 | $0.00 |
| WEEK 01W4 | 105 | | 93 | $432.60 | 88.57% | 12 | 11.43% | $501.95 | $38.62 | $540.57 | $107.97 | $4.65 |
| WEEK 04W5 | 20 | | 18 | $136.68 | 90.00% | 2 | 10.00% | $138.19 | $11.35 | $149.54 | $12.86 | $7.59 |
| TOTAL | 136 | | 111 | $869.28 | | 25 | | $640.14 | $49.97 | $690.11 | $120.83 | |

SYSTEM AND METHOD FOR STORING AND DISPLAYING RETURNED GOODS INFORMATION

FIELD OF THE INVENTION

The present invention generally relates to a computer-based system, method and computer readable medium comprising software for storing and displaying returned goods information ("RGI") for multiple retailers having multiple stores selling multiple products supplied by multiple vendors.

BACKGROUND OF THE INVENTION

Reverse logistics can be thought of as the process by which goods and materials are returned to a retailer and then flow backwards through the supply chain for the purpose of recapturing value and/or proper disposal. Reverse logistics involves physically transporting and disposing of returned goods, issuing correct invoices to the product vendor and correctly crediting the product retailer stores for the returned goods. Because large retailers may sell many different products in many different stores that are purchased from many different vendors, a prodigious amount of information about returned goods is captured and generated in the reverse logistics process. Retailers are thus interested in receiving information from the reverse logistic process that will be useful in reducing the costs associated with returned goods.

Systems and methods for analyzing returned goods information for a single consumer-store-vendor reverse supply chain have been known. A disadvantage of such known systems and methods is that they do not provide returned goods information for multiple retailers having multiple stores selling multiple products purchased from multiple vendors. Thus, a need exists for a system and method for efficiently storing and displaying returned goods information for multiple retailers having multiple stores that sell multiple products supplied by multiple vendors.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention is directed to a system, a method, a computer readable medium comprising computer software for storing and displaying returned goods information. In an embodiment of the invention, a computer-implemented method, and a computer readable medium comprising software, displays user-selected returned goods information for a retailer having a plurality of stores and a plurality of vendors. The method includes the steps of providing a computer database of returned goods information for a retailer having a plurality of stores and a plurality of vendors, receiving via a user interface at least one condition for displaying user-selected returned goods information for the stores or vendors, determining whether the condition for displaying the returned goods information is satisfied for each of the stores and vendors, and displaying the returned goods information for which the condition is met for each of the stores and vendors. The method is further comprised of displaying the returned goods information for a time period, the time period being a most recently completed time period, such as the most recently completed accounting period. The method also includes displaying a number that represents a number of stores associated with the retailer that satisfy the condition received via the user interface and displaying information identifying each store that is associated with the retailer that satisfies the condition. The returned goods information can be a store identifier, number of units of goods returned, cost of the goods, retail price of goods, total value of goods returned to store, total value of store credits, store department, store category, returned good vendor identifier, return good vendor name, good identifier, good description, good disposition, and handling charges. The condition is comprised of a characteristic of a returned good, a disposition of a returned good or a department of one of the retailers. The characteristic of the returned good may be creditable, billable, private label, discontinued or subject to an adjustable rate policy. The disposition information may be destroy, donate, hold, liquidate, refurbish, ship to or recycle.

Another embodiment of the invention is a computer-implemented method and computer readable medium comprising software for storing returned goods information for a plurality of retailers having a plurality of stores selling a plurality of goods purchased from a plurality of vendors. The method is comprised of creating a plurality of retailer computer databases, each of which includes returned goods information for one of each of the plurality of retailers, aggregating the plurality of retailer computer databases into an aggregated computer database of returned goods information, and associating the returned goods information for each of the plurality of retailers stored in the aggregated computer database with a predefined time period for each of the plurality of retailers. The computer database may include store credit information, invoice information, item information, disposition information and shipping information.

Another embodiment of the invention is a system for displaying user-selected returned goods information for a plurality of retailers or a plurality of vendors. The system includes at least one server computer that maintains a database of return goods information for a plurality of retailers that purchase goods from a plurality of vendors. The system also includes a client computer for receiving input via a user interface a condition for displaying user-selected returned goods information for the plurality of retailers or the plurality of vendors. The server determines whether the condition for displaying the returned goods information is satisfied for the stores or vendors. The client computer displays the returned goods information for which the condition is met for each of the plurality of stores, each of the plurality of vendors, or both the plurality of stores and the plurality of vendors.

BRIEF DESCRIPTION OF THE DRAWINGS

FIGS. 7A through 7D are exemplary screen displays that illustrate how a user can specify conditions for displaying returned goods information for sources, i.e., stores.

FIG. 8A through 8C are exemplary screen displays that illustrate how a user can specify conditions for displaying return goods information for vendors.

FIG. 10 is an exemplary screen display illustrating more detailed returned goods information for particular stores.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Figure 1:
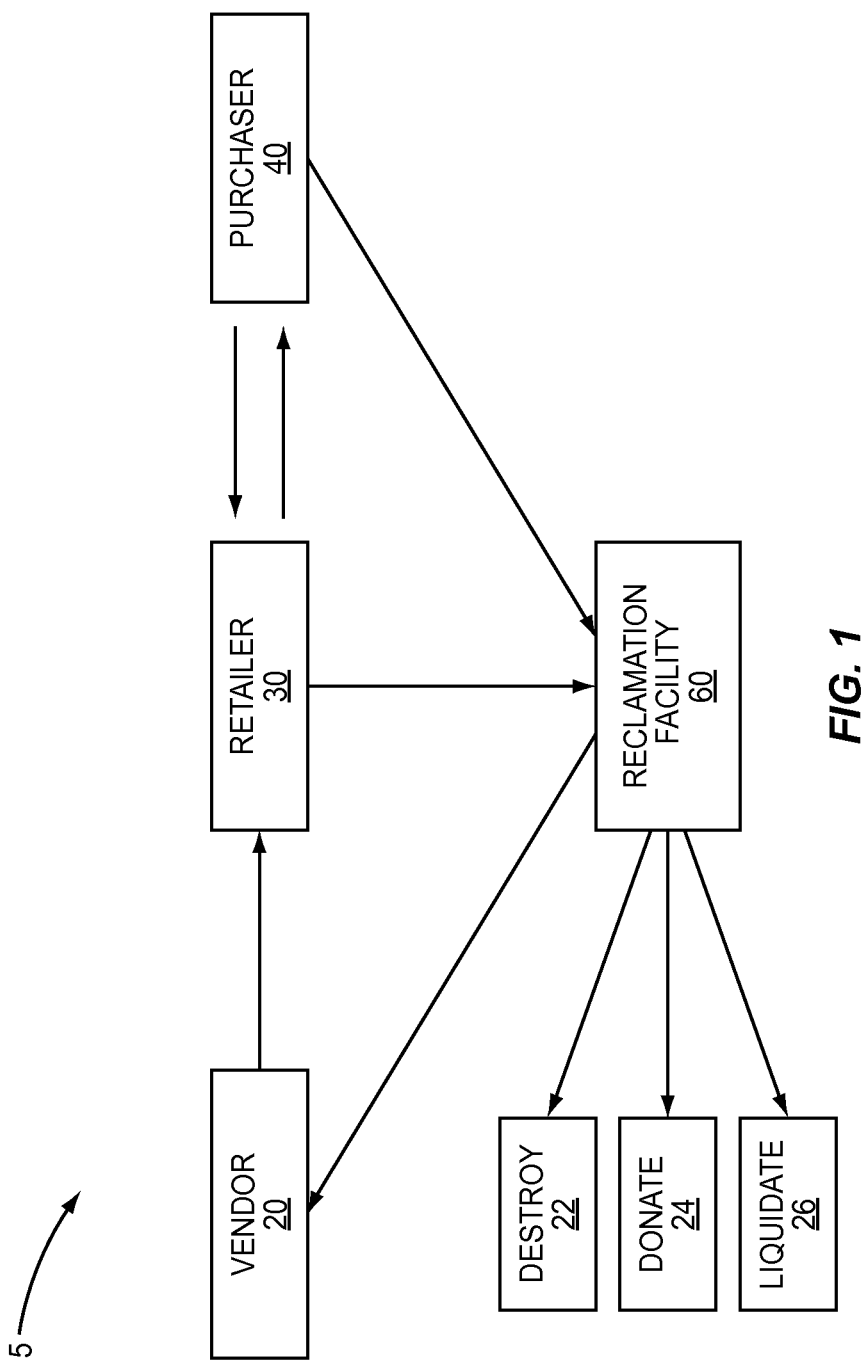
FIG. 1 is a diagram illustrating a supply chain and a reverse logistics process.

FIG. 1 is a diagram illustrating a supply chain and a reverse logistics process 10, which includes a vendor 20, retailer 30, purchaser 40 and at least one reclamation facility 60. Goods are manufactured or otherwise acquired by a vendor 20 and are sold or distributed to one or more retailers 30, who resell the goods to a purchaser 40. As used herein, "retailer" refers to an entity in the business of purchasing and reselling goods for profit. A "vendor" refers to an entity in the business of manufacturing or distributing goods for profit. A retailer may sell goods at one or more physical stores or online.

The reverse logistics process begins when, for a variety reasons, the purchaser 40 or retailer 30 returns a product for a refund, exchange, or credit. In some cases, the purchaser 40 ships the returned product directly to the retailer and the retailer in turn sends the returned product to a reclamation facility 60. Alternatively, the purchaser may send the returned product directly to reclamation facility 60. The reclamation facility 60 sorts the returned products/goods by retailer and then scans the universal product code ("UPC") for each of the returned goods and captures items of returned goods information, which is stored in a database. Reclamation facility 60 then disposes of the returned products. Disposal of the returned goods may include return to the vendor 20, destruction 22, donation 24 or liquidation 26.

Figure 2:
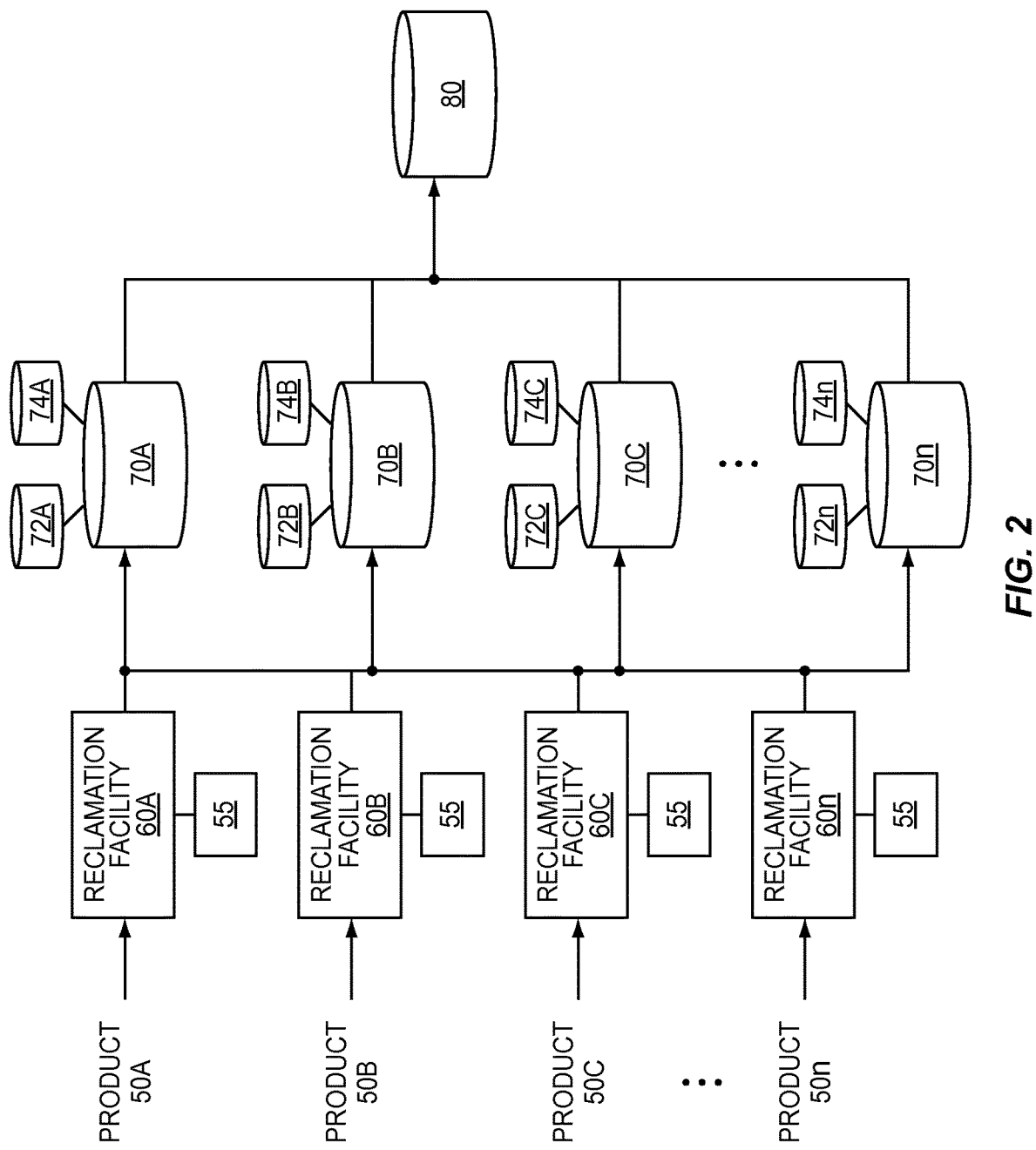
FIG. 2 is a diagram illustrating a system for creating an aggregated database of returned goods information.

FIG. 2 is a diagram illustrating a system 10 for creating an aggregated database of returned goods information for a plurality of retailers. The system 10 includes a plurality of reclamation facilities 60, a plurality of computer databases for storing returned-item-transactions (RIT) 70, item and vendor master files 72 and 74, and an aggregated returned goods information RGI database 80. Returned goods information may include, but is not limited to, store identifier, number of units of goods returned, cost of the goods, retail price of goods, total value of goods returned to a store, total value of store credits, store department, store category, returned good vendor identifier, returned good vendor name, good identifier, good description, good disposition, shipping information, invoicing information and handling charges.

Typically, a retailer's returned goods would be returned to and processed by a reclamation facility associated with that retailer. Thus, FIG. 2 represents reverse supply chains for retailers A, B, C, . . . and N. Reclamation facility 60A is associated with retailer A and goods returned to retailer A are sent to reclamation facility 60A. Similarly, reclamation facilities 60B, 60C and 60N are associated with retailers B, C, and N, respectively, and goods returned to retailers B, C and N are returned to reclamation facilities 60B, 60C and 60N. Alternatively, a reclamation facility may be associated with one or more products (as opposed to a retailer) and, therefore, a particular product may be returned to a particular reclamation center, regardless of the retailer of the product. In other embodiments, a reclamation facility may be associated with one or more vendors.

When a returned product is sent to a reclamation facility, the reclamation facility sorts the products by retailer. Next, the reclamation facility captures information about the returned goods by scanning the returned goods' UPC code, National Drug Code, bar code, RFID tag, or other known methods for encoding information about a product. The information captured via scanning is stored in a database 70A, 70B, 70C or 70N that is associated with the retailer A, B, C or N of the returned good. A reclamation facility may process returned goods for a retailer for a period of time that may correspond to a retailer specified accounting period, e.g., weekly, monthly, quarterly, annually, etc. In other embodiments, however, the period of time may not be the same as a retailer specified accounting period.

Returned goods data is stored in databases 70A, 70B, 70C and 70N. Item master files 72A, 72B . . . 72N and vendor master files 74A, 74B . . . 74N are used to expand the returned goods information stored in the plurality RIT databases 70. The item master file 72 may include, but is not limited to, item UPC, description of the item, cost of the item, retail price of the item, return authorizations (if any), and product category. The vendor master file 74 may include, but is not limited to, vendor name, vendor address, disposition and billing factors.

The reclamation facility 60 may determine disposition instructions for the returned goods 50, if any. Returned goods 50 may be disposed of 55 by shipping goods to vendor 20, destroying the returned goods 22, donating the returned goods 24, or liquidating the returned goods 26. Other dispositions may include holding the returned goods, shipping the returned goods to a vendor specified destination, or refurbishing or recycling the returned goods.

RIT databases 70 may be organized by retailer 30, which means that each of the plurality of RIT databases 70 includes returned goods information for each of a plurality of retailers. That is, one RIT database 70 may be specific to a single retailer 30. In alternate embodiments, there may be more than one RIT database 70 per retailer. In still other alternate embodiments, there may be several retailers 30 that comprise a RIT database 70.

The RIT database 70 and aggregated returned goods information database 80 allows efficient extraction, display and reporting of user-specified returned goods information by a graphical user interface 90. An aggregated RGI database 80 receives, organizes, and stores returned goods information from the plurality of RIT databases 70. In an embodiment, the information contained in the RIT database, the item master files 72 and vendor master files 74 is aggregated into RGI database 80.

In an embodiment, the aggregated RGI database 80 may include a returned goods information that is stored according to a predetermined time period. A retailer 30 may operate various business functions on set period of time, e.g., a predefined accounting period. A aggregated RGI database 80 stored by time permits filtering, extracting, display and reporting of returned goods information specific to the retailer's predefined accounting period. In some embodiments, a period may be a day, week, month, quarter, or any pre-defined period of time.

Figure 3:
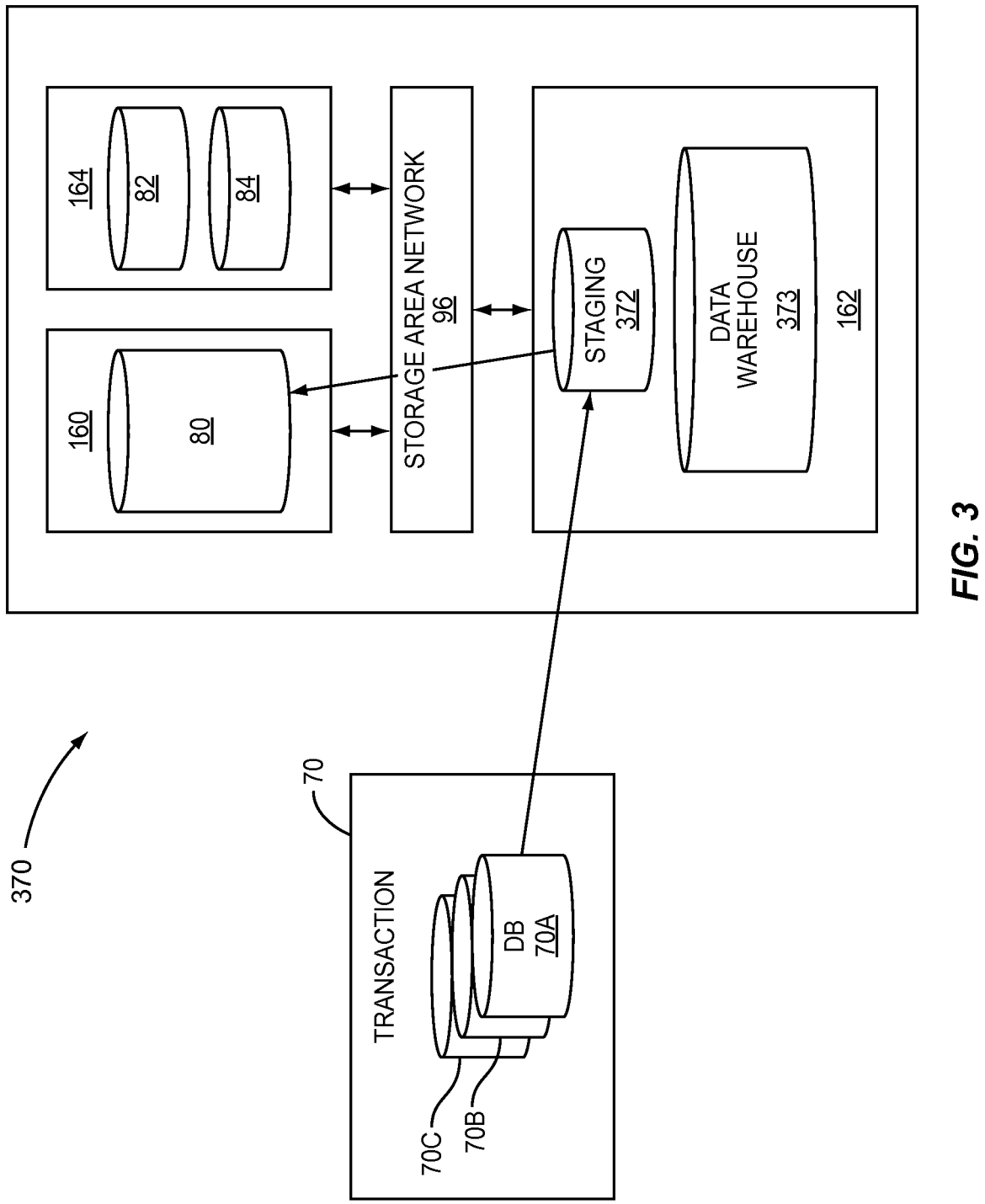
FIG. 3 is a logical diagram illustrating further details of a process for creating an aggregated database of returned goods information.

FIG. 3 is a logical diagram illustrating further details of a process for creating an aggregated database of returned goods information using an extract-transform-load ("ETL") process 370. As shown in FIG. 3, records from the plurality of RIT databases 70A, 70B, 70C are extracted, and processed in batches to a staging database 372 on server 162. In an embodiment, the extraction typically occurs hourly. In other embodiments, extraction may occur every minute, hour, or any other increment of time. An additional read only database 373 provides a back up for the staging database 372. Transformation and back ups occur during extraction. In a further embodiment of the ETL process, each RIT databases 70A, 70B and 70C send an XML message via a service queue to the RGI database 80 to provide real time updates and aggregations.

Data from the staging database 372 is loaded into the aggregated RGI database 80 on server 160. Multiple processed rows from the staging database 372 are bulk inserted into the aggregated RGI database 80. In other embodiments, single rows and columns may be inserted into the aggregated RGI database 80. The staging database 372 may initially aggregate returned goods information. Metadata 82 and read-write online transaction processing ("OLTP") 84 may be on server 164. The online transaction processing 84 may facilitate interaction with a web application and graphical user interface. In an embodiment, the first, second and third servers 160, 162, and 164 may be one physical server, or more than one physical server. A storage area network 96 may be used to store the data stored in the first 160, second 162, and third server 164.

Figure 4:
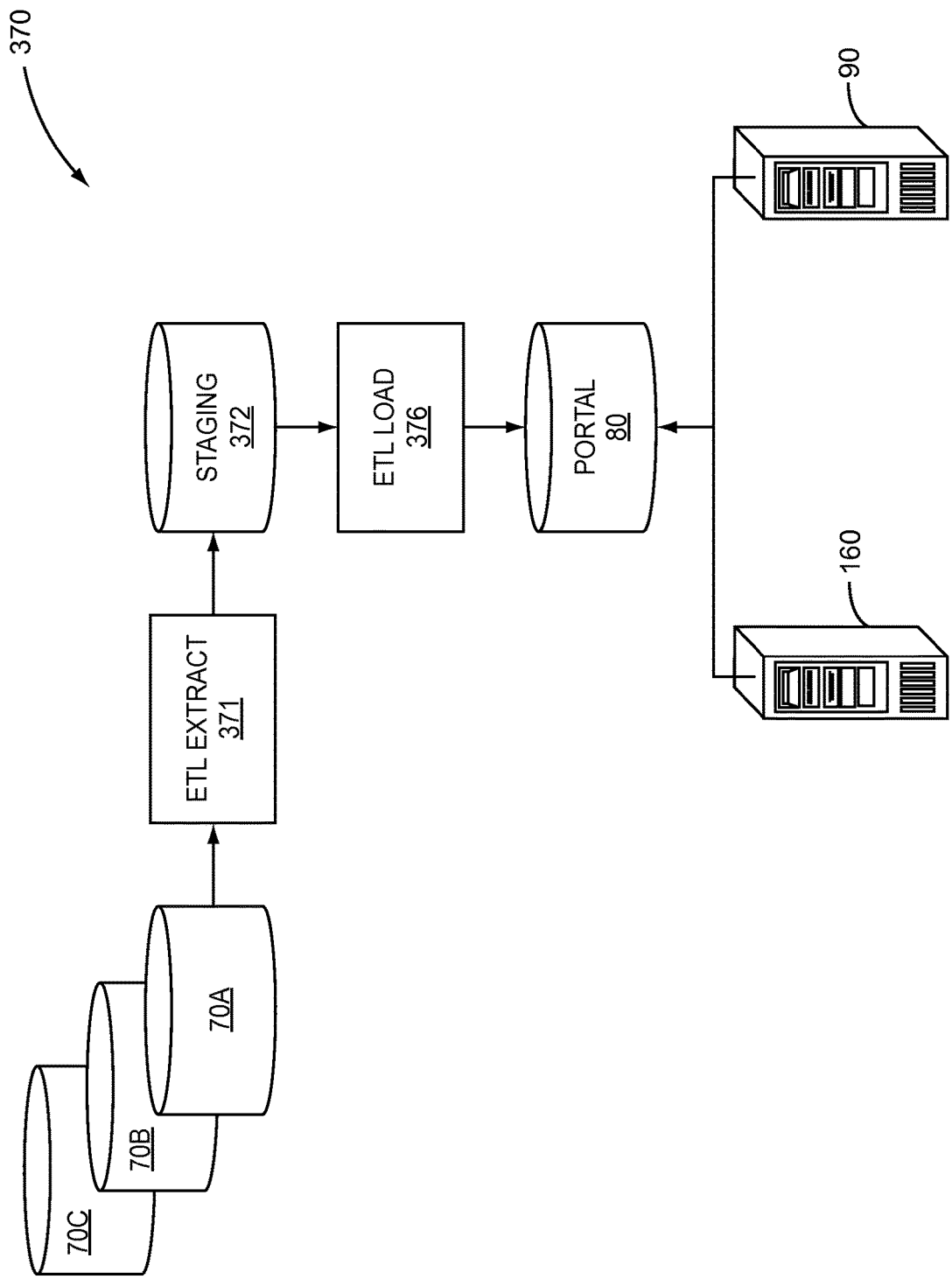
FIG. 4 is a physical diagram illustrating further details of a system and method for creating an aggregated database of returned goods information.

FIG. 4 is a physical diagram illustrating further details of a system and method for creating an aggregated database of returned goods information. Specifically, FIG. 4 shows how an ETL process 370 is used to create an aggregated database of returned goods information. Returned goods information from the RIT databases 70A, 70B and 70C is transformed and extracted (block 371). A staging database 372 stores the returned goods information to be loaded into the aggregated RGI database 80. Extraction typically occurs hourly, or during times when the aggregated RGI database load is not occurring.

An aggregated RGI database 80 stores data and the graphical user interface running on computer 90 displays user-selected, i.e. user specified, returned goods information. A user initially provides credentials via the graphical user interface running on a computer 90. Upon verification of the user credentials, i.e. a user name and password, the graphical user interface displays screen 191, which is shown in FIG. 5.

Figure 5:
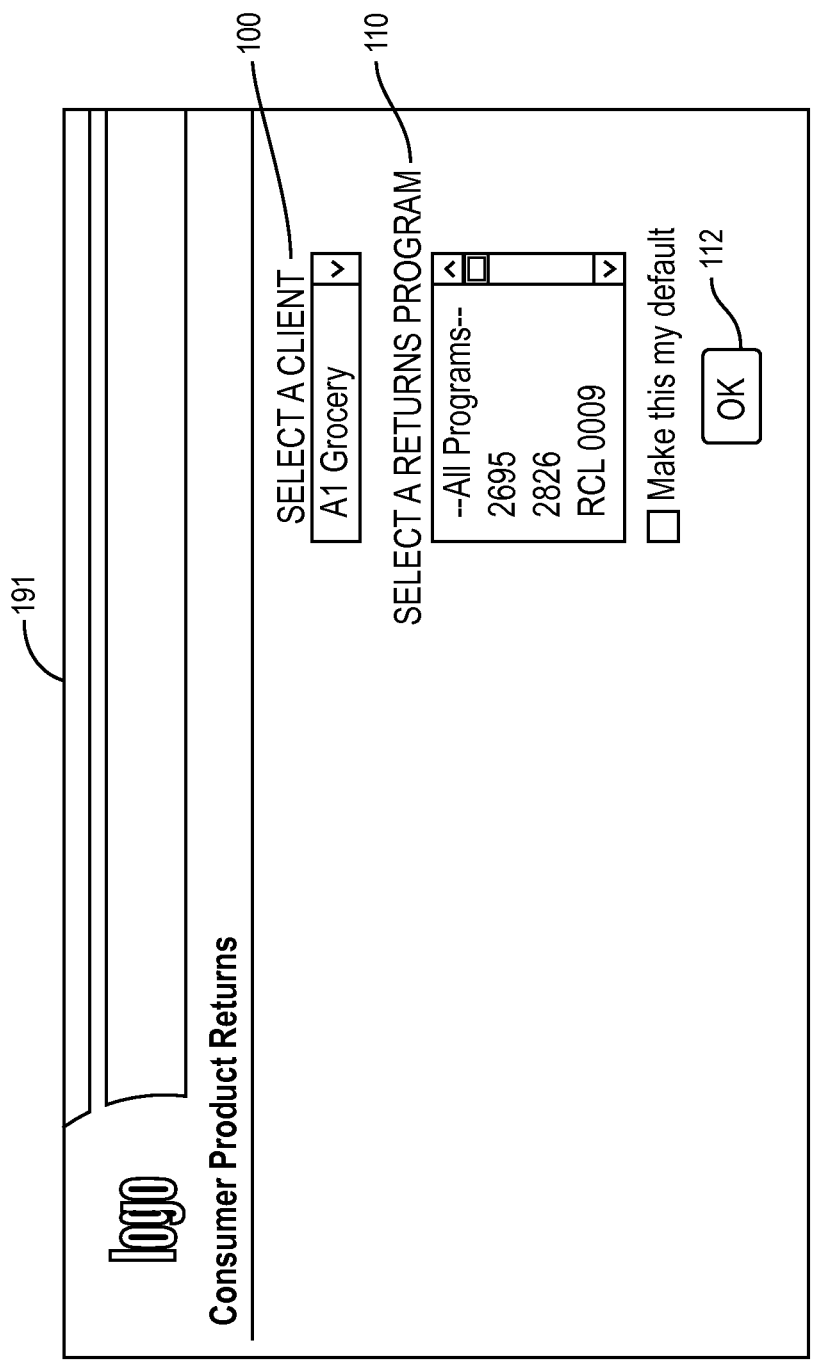
FIG. 5 is an exemplary screen display for selecting a client or entity, or a returned goods program for which returned goods information is to be displayed.

FIG. 5 is an exemplary screen shot for selecting a client (or entity), or a returns program for which returned goods information is to be displayed. As shown in FIG. 5, a user may select via drop down box 100 a particular entity (or client) for which store 200 and/or vendor 400 watch lists are created and displayed. A returns program, which may be selected via drop down box 110, may include a damage program, recall program, or a planogram program. In other embodiments, a returns program may be customized for an entity. The user also may set the selected entity and/or return programs as defaults by selecting default checkbox 111 and then selecting the OK button 112. If the user does select a default client or returns program, FIG. 6A or 6B is displayed after the user logs in.

The graphical user interface generates a series of screen displays 191, 192, 193, 194, and 195 as shown in FIGS. 6A through 8C that allow a user to set one or more conditions for displaying returned goods information. The user may then save the various conditions for displaying returned goods information set by that user.

In an embodiment, after logging in and if the user has selected a default client and/or entity, or after logging in and selecting a client and/or returns program, the graphical user interface initiates a predefined query to the aggregated RGI database 80. The system database 80 processes the query and returns a number representing the number of stores (or vendors) that meet the conditions specified by the user via the graphical user interface.

Figure 6A:
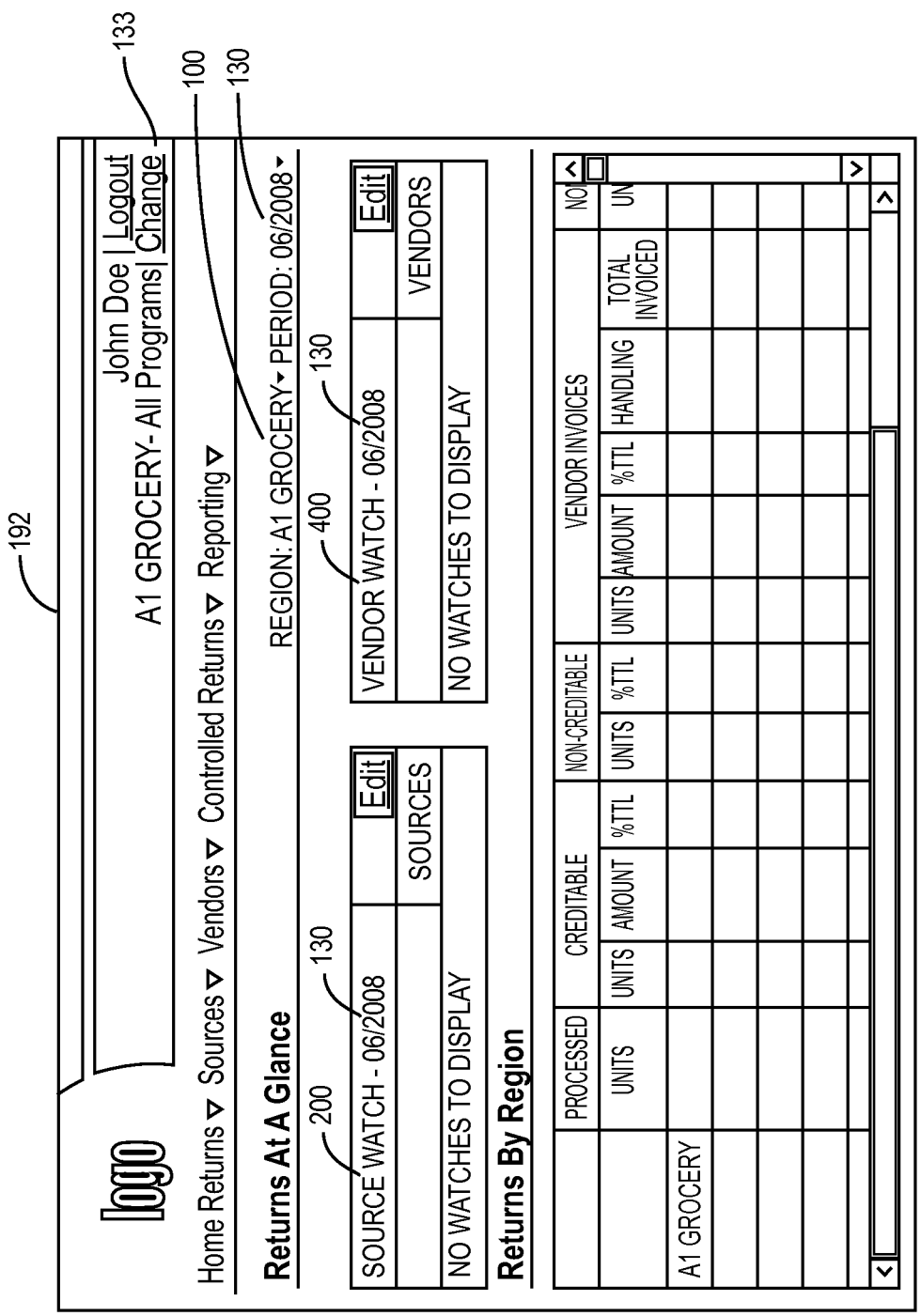
FIGS. 6A and 6B are screen displays showing exemplary retailer and vendor watch lists generated by the system and method of the present invention.
Figure 6B:
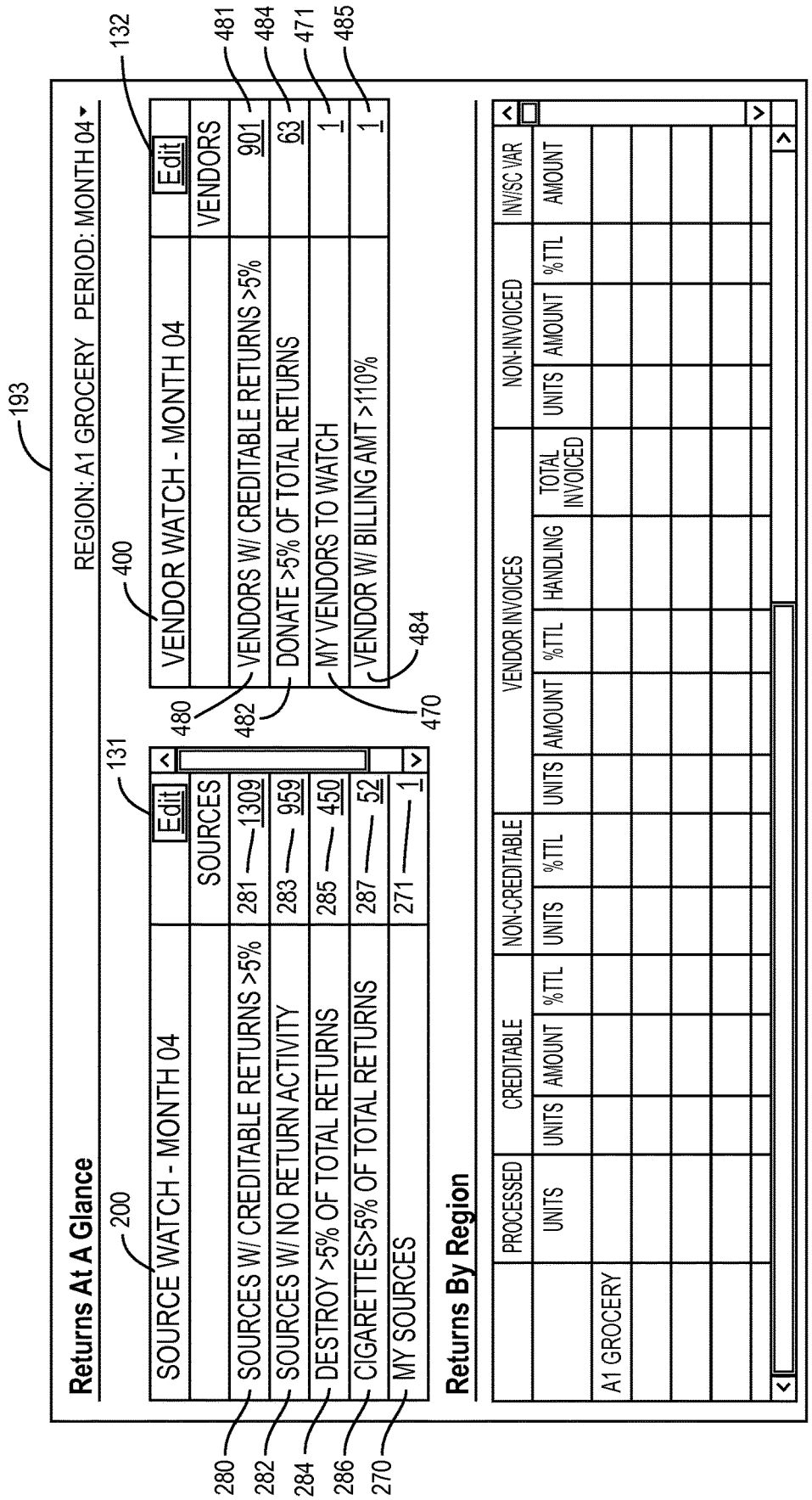

FIGS. 6A and 6B are screen displays showing exemplary retailer and vendor watch lists generated by the system and method of the present invention. The watch lists are generated by the aggregated RGI database 80 and displayed via the user interface. As shown in FIG. 6A, the store watch list 200 shows an entity 100 and time period 130 for which returned goods information is being displayed. The vendor watch list 400 is also shown for the same time period 130. A user can modify the conditions for displaying returned goods information for sources by selecting Edit button 131; similarly, a user can modify the conditions for displaying returned goods information for vendors by selecting Edit button 132. When a user selects Edit button 131, the user interface causes screen display 194 of FIG. 7A to be displayed, and when a user selects Edit button 132, the user interface causes screen display 195 of FIG. 8A to be displayed. A user can change the sources and vendors for which returned goods information is displayed by selecting the Change hyperlink 133, which causes screen display 191 of FIG. 5 to be displayed.

FIG. 6B is a screen display showing exemplary store 200 and vendor 400 watch lists. The store watch list 200 shows the total number of stores that meet one or more conditions specified by the user via the graphical user interface. In the example shown, the store watch list 200 displays numbers representing the total number of stores in fields 281, 283, 285, 287 and 271 that meet five (5) user-specified conditions, 280, 282, 284, 286 and 270. As shown in Exhibit 6B, the user-specified conditions are "creditable returns that are greater than 5% of total returns" 280, "stores with no return activity" 282, "stores that destroy greater than 5% of total returns" 284, "stores where cigarettes are greater than 5% of total returns" 286, and "My Stores" 270. Other conditions and more or less than five conditions for displaying returned goods information may be specified by a user.

As shown in FIG. 6B, there are 1,309 stores that meet the condition 280. The number representing the number of stores that meet the condition 281 is also a hypertext link 281 that, when selected, causes the graphical user interface to display a screen display similar to screen display 196 of FIG. 9, which displays more detailed information for each of the plurality of stores meeting the user-specified condition, and which is discussed in more detail below.

A vendor watchlist 400 is also shown in FIG. 6B. The vendor watchlist 400 also displays a number 481, which represents the number of vendors that meet condition 480. For example, vendor watchlist 400 includes the number of vendors with creditable returns greater than 5% of total returns 480. As shown, there are 901 vendors that meet condition 480. Again, each of the numbers representing the number of vendors meeting a condition are hypertext links which, when selected by user, cause the graphical user interface to display more detailed information for each of vendors and/or items meeting the user specified condition.

The vendor watch list 400 also displays numbers representing the number of vendors that meet other conditions 482, 470, and 484, specified by the user. For example, the "number of vendors that donate greater than 5% of total returns" 482, "vendors with billing amounts greater than 110% of total returns" 484, and total number of "My Vendors" 470 are shown. In other embodiments, more or fewer conditions for displaying returned goods information specific to vendors may be specified by the user.

Figure 7A:
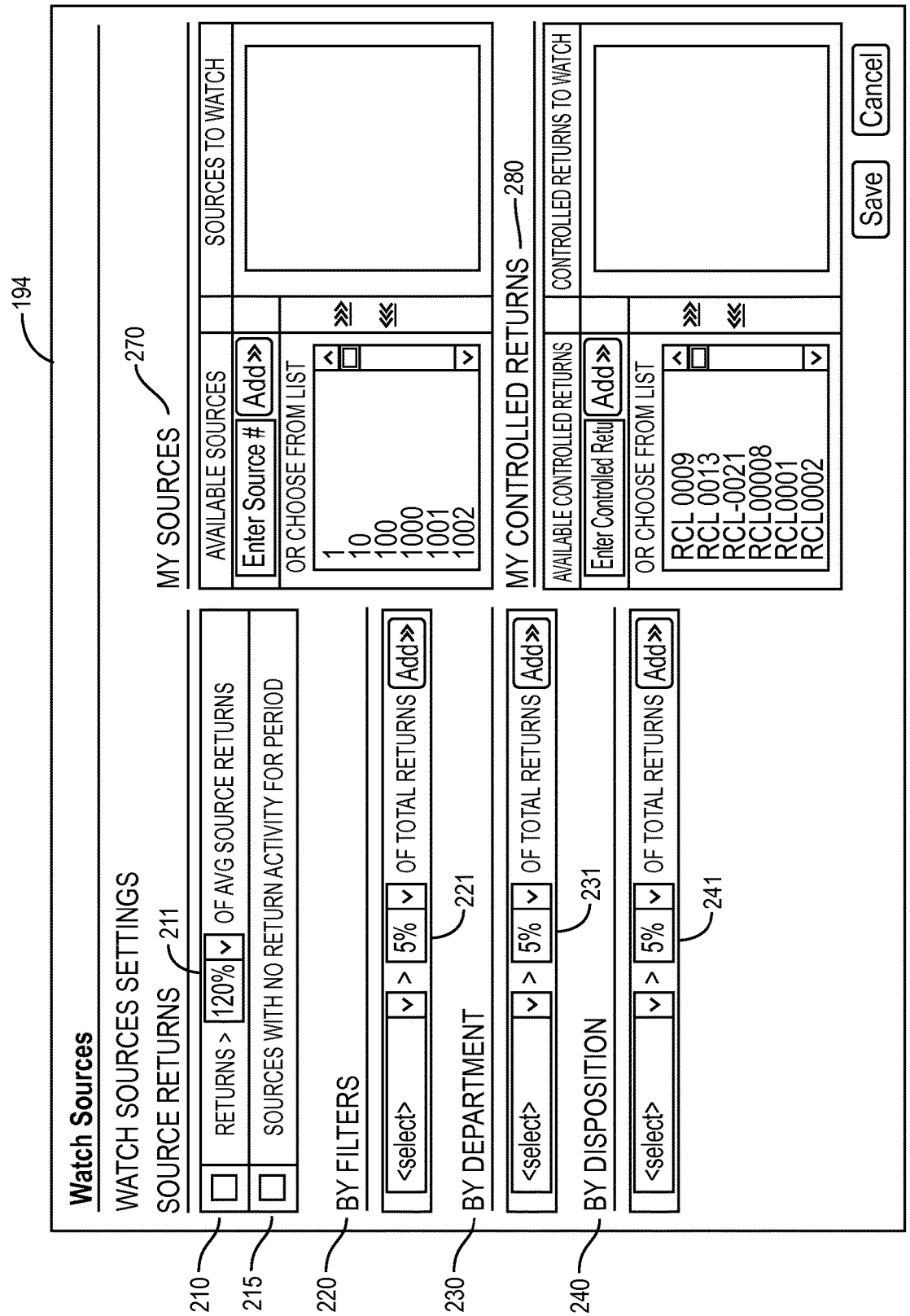

FIGS. 7A through 7C are exemplary screen displays that illustrate how a user can specify conditions for displaying return goods information for sources, i.e., stores, for a retailer. Examples of such user-specified conditions may include the number of returns compared to the average returns 210. For example, user specified condition 210 is set to display the number of stores with returns that are greater than 120% of the average store returns. A user can also specify that stores with no return activity for the relevant time period be displayed 215. A user also may specify a characteristic of the returned goods 220 "By Filters," which is further illustrated in FIG. 7B. A user can further specify a department 230 and a disposition of the returned good 240. Further, the percent of total returns 221, 231, and 241 may be varied for each the returned good characteristic 220, department, 230 or disposition 240, respectively. A user can further specify adding stores to, or removing stores from, a "My Stores" list 270. In addition, a user may specify adding stores to, or removing stores from a "My Controlled Returns" list 280.

FIG. 7B is an exemplary screen display 194 that illustrates specifying returned goods information for stores to be displayed by selecting a characteristic 220 of the returned goods information. The characteristic 220 may include, but is not limited to, non-creditable, billable, non-billable, private label, non-private label, discontinued, non-discontinued, average return price (ARP), non-ARP, and creditable. ARP refers to a policy between a retailer and vendor where predetermined fee is paid for returned goods, regardless of the level of returns. For example, the user can select "Billable," which will cause the user interface to display the number of stores with billable goods that exceeds total returns by a user-specified percentage 221. One or more characteristics shown in FIG. 7B may be specified by the user.

FIG. 7C is an exemplary screen display 194 that illustrates specifying returned goods information for stores to be displayed by selecting a department 220 of a retailer. A department 230 may include any department of a store. Exemplary departments shown in FIG. 7C are dairy, deli, store equipment, store supplies, cigarettes, and bakery. A clothing store may have departments such as women's, men's, juniors, youth, accessories, shoes, etc. A user may specify one or more of the departments 230 as a condition for displaying returned goods information.

FIG. 7D is an exemplary screen display 194 that illustrates specifying returned goods information for stores to be displayed by selecting a disposition 240 of returned goods. A disposition of the return good 240 may include, but is not limited to, center option, hold for vendor review, destroy special, donate, ship the product, destroy the product, recycle, refurbish or liquidate. Various other dispositions may be added that are particular to a retailer. Again, a user may specify one or more of the dispositions 240 as a condition for displaying returned goods information.

Figure 8C:
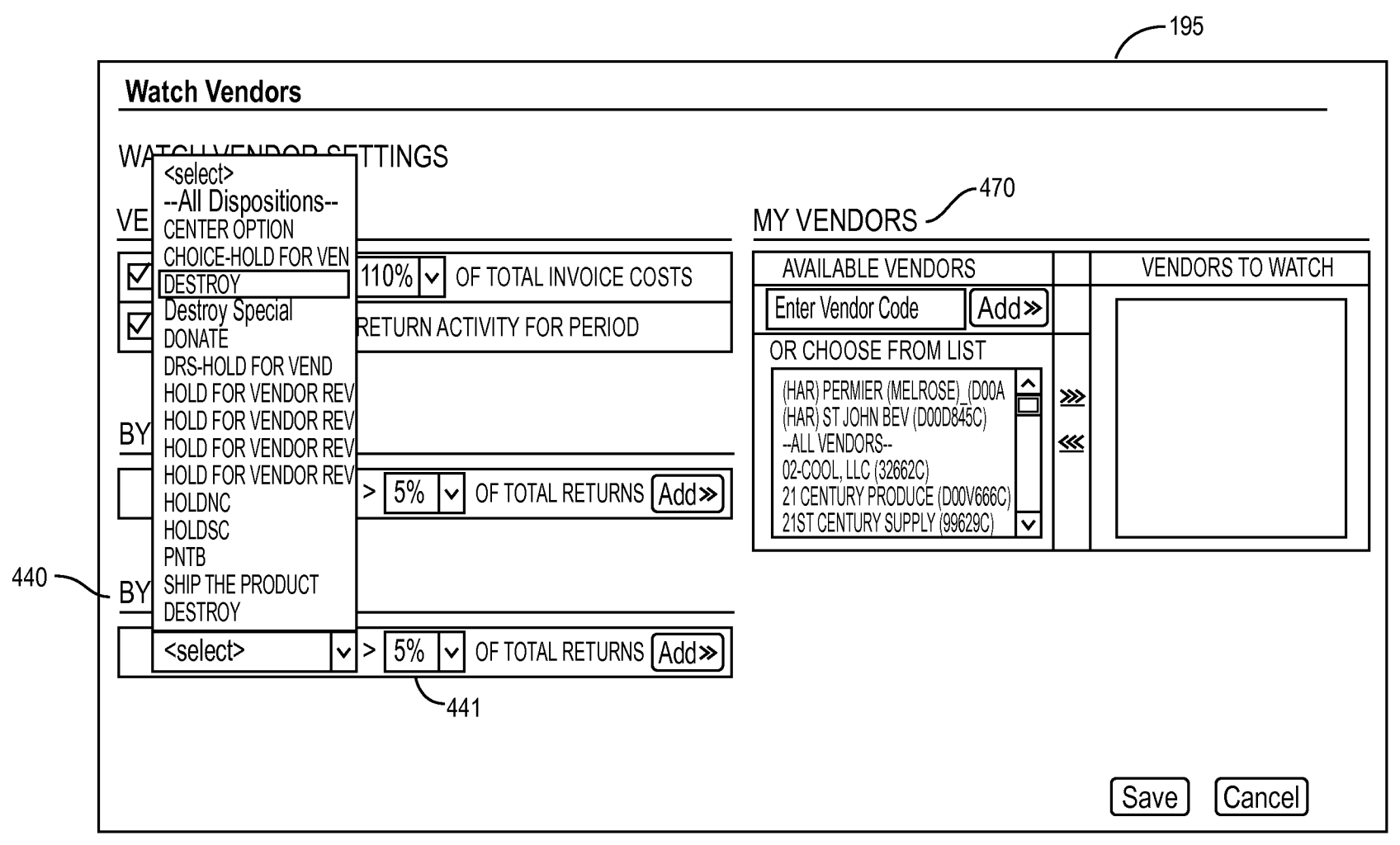

FIG. 8A through 8C are exemplary screen displays that illustrate how a user can specify conditions for displaying return goods information for vendors. As can be seen in FIG. 8A, examples of user-specified conditions include the billing amount as a percentage of total invoice cost 410 and stores with no return activity for the period 415. A user also may specify a characteristic of a returned good 420, or a disposition of the returned goods 440. The percent of total invoice costs 411 also may be selected by a user. In addition, the percent of total returns 421 and 441 may be varied for each returned good characteristic 420, and dispositions 440, respectively. As shown in FIG. 8A, condition 410 is specified to display the number of vendors with a billing amount 410 that exceeds "110%" 411 of the total invoice cost. The vendor watch list 400 can include other options. For example, a user can select particular vendors to monitor by adding vendors at the "My Vendors" list 470.

FIG. 8B is an exemplary screen display 195 that illustrates specifying returned goods information to be displayed for a vendor by selecting a characteristic 420 of the returned goods information. The characteristic of a returned good 420 may include, but is not limited to, creditable, non-creditable, billable, non-billable, private label, non-private label, discontinued, non-discontinued, ARP, and non-ARP. A user may specify one or more of the characteristics 420 as a condition for displaying returned goods information.

FIG. 8C is an exemplary screen display 195 that illustrates specifying returned goods information to be displayed for vendors by selecting a disposition 240 of returned goods. Again, a user may specify one or more of the dispositions 440 as a condition for displaying returned goods information.

Figure 9:
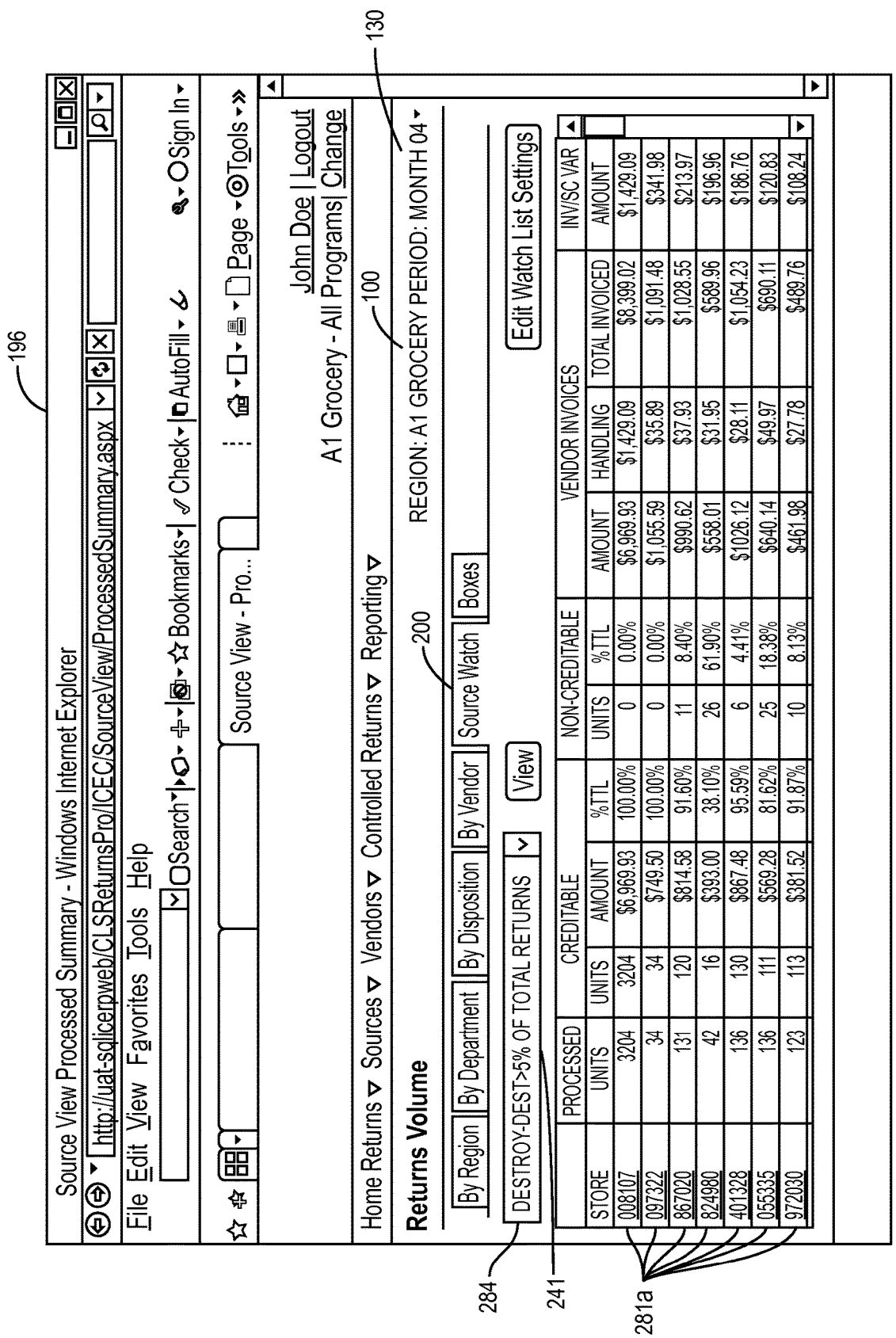
FIG. 9 is an exemplary screen display showing specific stores that meet a user-specified condition.

FIG. 9 is an exemplary screen display 196 showing specific stores that meet a user-specified condition. As can be seen from FIG. 9, the specific stores that meet the user-specified condition 284, i.e., destroy greater than 5% of the total returns, are displayed as hypertext links 281a. A user may select one of the hypertext links 281a that represents returned goods information for a particular store to display more detailed information about the selected store. For example, if a user selects the hypertext link for store "05335," the user interface causes screen display 197 to be displayed, which displays more detailed returned goods information for that store. FIG. 10 displays returned goods information for the same period 130 and conditions that are specified in the store watch list 200, which is shown in FIG. 6B. The period 130 may include the last reported accounting period for this particular store.

FIG. 10 is an exemplary screen display 197 illustrating more detailed returned goods information for particular stores. As can be seen from FIG. 10, returned goods information that may be displayed may include, but is not limited to, processed items, creditable invoices, non-creditable invoices and invoice variances for the various number of stores that meet the user-specified condition 284. The number of processed items refers to the number of items that have been returned, scanned, and disposed during a period 130. A user may select a hypertext link 281b, which represents the number of units of a particular item that have been returned to a particular store, which will cause the user interface to display returned goods information for particular items.

Figure 11:
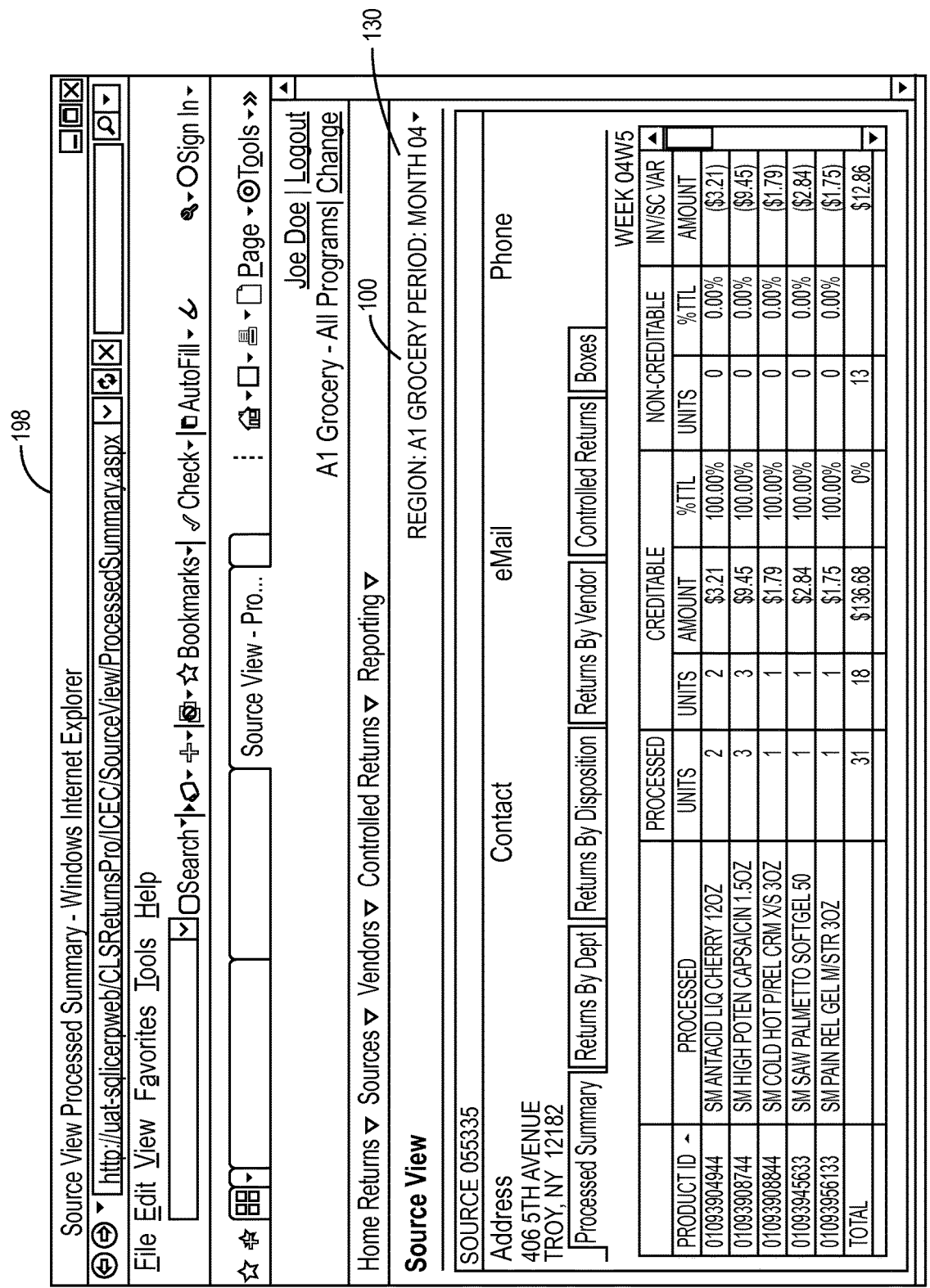
FIG. 11 is an exemplary screen display illustrating more detailed returned goods information for particular items.

FIG. 11 is an exemplary screen display 198 illustrating more detailed returned goods information for particular items. As can be seen in FIG. 11, screen display 198 shows an item level view of returned goods information that meets the user specified condition at a particular store. Displayed information may include, but is not limited to, processed units, creditable units, percentage and total creditable units, non-creditable units percent and total non-creditable units and the invoice variances.

While preferred embodiments of the present invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. A method of processing returned goods information for a plurality of retailers having a plurality of stores selling a plurality of goods purchased from a plurality of vendors, the method comprising:
creating a plurality of retailer computer databases, wherein each of the plurality of retailer computer databases includes returned goods information for each of the plurality of retailers;
aggregating each of the plurality of retailer computer databases into an aggregated computer database of returned goods information based upon an extract-transform-load process comprising
extracting, at each of a plurality of scheduled time periods, the returned goods information from each of the plurality of retailer computer databases,
transforming the returned goods information from each of the plurality of retailer computer databases to a common format,
processing, the extracted and transformed returned goods information in batches to a staging database, and
loading the processed extracted returned goods information from the staging database to the aggregated computer database by bulk inserting multiple processed rows from the staging database into the aggregated computer database,
the aggregated computer database comprising returned goods information, item master files, and vendor master files from at least two of the plurality of retailer computer databases;
associating the returned goods information for each of the plurality of retailers stored in the aggregated computer database with a predefined time period for each of the plurality of retailers and enabling displaying of returned goods information for each of the plurality of retailers for the predefined time period; and
permitting access to the associated returned goods information stored in the aggregated computer database by a corresponding one of the plurality of retailers for the displaying of the returned goods information.

2. The method of claim 1, wherein the returned goods information comprises at least one of a store identifier, number of units of goods returned, cost of the goods, retail price of goods, total value of goods returned to store, total value of store credits, store department, store category, returned goods vendor identifier, return goods vendor name, goods identifier, goods description, goods disposition, and handling charges.

3. The method of claim 1, wherein creating the plurality of retailer computer databases comprises creating a plurality of retailer databases each comprising store credit information, invoice information, item information, disposition information, and shipping information.

4. A non-transitory computer readable medium having stored thereon instructions for accessing and managing a plurality of remote computers which, when executed by a processor, cause the processor to:
create a plurality of retailer computer databases, wherein each of the plurality of retailer computer databases includes returned goods information for each of the plurality of retailers;
aggregate each of the plurality of retailer computer databases into an aggregated computer database of returned goods information based upon an extract-transform-load process comprising instructions for causing the processor to
extract, at each of a plurality of scheduled time periods, the returned goods information from each of the plurality of retailer computer databases,
transform the returned goods information from each of the plurality of retailer computer databases to a common format,
process, the extracted and transformed returned goods information in batches to a staging database, and
load the processed extracted returned goods information from the staging database to the aggregated computer database by bulk inserting multiple processed rows from the staging database into the aggregated computer database,
the aggregated computer database comprising returned goods information, item master files, and vendor master files from the plurality of retailer computer databases;
associate the returned goods information for each of the plurality of retailers stored in the aggregated computer database with a predefined time period enabling displaying of returned goods information for each of the plurality of retailers for the predefined time period; and
permit access to the associated returned goods information stored in the aggregated computer database by a corresponding one of the plurality of retailers for the displaying of the returned goods information.

5. The method of claim 1 wherein the plurality of scheduled time periods comprises hourly.

6. The non-transitory computer readable medium of claim 4 wherein the instructions cause the processor to create the plurality of retailer databases each comprising store credit information, invoice information, item information, disposition information, and shipping information.

7. The non-transitory computer readable medium of claim 4 wherein the plurality of scheduled time periods comprises hourly.

8. A method of processing returned goods information for a plurality of retailers having a plurality of stores selling a plurality of goods purchased from a plurality of vendors, the method comprising:

creating a plurality of retailer computer databases, wherein each of the plurality of retailer computer databases includes returned goods information for each of the plurality of retailers;

aggregating each of the plurality of retailer computer databases into an aggregated computer database of returned goods information based upon an extract-transform-load process comprising extracting, at each of a plurality of scheduled time periods, the returned goods information from each of the plurality of retailer computer databases, transforming the returned goods information from each of the plurality of retailer computer databases to a common format, processing, the extracted and transformed returned goods information in batches to a staging database, and loading the processed extracted returned goods information from the staging database to the aggregated computer database by inserting single rows and columns of returned goods information into the aggregated computer database, the aggregated computer database comprising returned goods information, item master files, and vendor master files from at least two of the plurality of retailer computer databases;

associating the returned goods information for each of the plurality of retailers stored in the aggregated computer database with a predefined time period for each of the plurality of retailers and enabling displaying of returned goods information for each of the plurality of retailers for the predefined time period; and permitting access to the associated returned goods information stored in the aggregated computer database by a corresponding one of the plurality of retailers for the displaying of the returned goods information.

9. The method of claim 8, wherein the returned goods information comprises at least one of a store identifier, number of units of goods returned, cost of the goods, retail price of goods, total value of goods returned to store, total value of store credits, store department, store category, returned goods vendor identifier, return goods vendor name, goods identifier, goods description, goods disposition, and handling charges.

10. The method of claim 8, wherein creating the plurality of retailer computer databases comprises creating a plurality of retailer databases each comprising store credit information, invoice information, item information, disposition information, and shipping information.

11. The method of claim 8 wherein the plurality of scheduled time periods comprises hourly.

12. A non-transitory computer readable medium having stored thereon instructions for accessing and managing a plurality of remote computers which, when executed by a processor, cause the processor to:

create a plurality of retailer computer databases, wherein each of the plurality of retailer computer databases includes returned goods information for each of the plurality of retailers;

aggregate each of the plurality of retailer computer databases into an aggregated computer database of returned goods information based upon an extract-transform-load process comprising instructions for causing the processor to extract, at each of a plurality of scheduled time periods, the returned goods information from each of the plurality of retailer computer databases, transform the returned goods information from each of the plurality of retailer computer databases to a common format, process, the extracted and transformed returned goods information in batches to a staging database, and load the processed extracted returned goods information from the staging database to the aggregated computer database by inserting single rows and columns of returned goods information into the aggregated computer database, the aggregated computer database comprising returned goods information, item master files, and vendor master files from the plurality of retailer computer databases;

associate the returned goods information for each of the plurality of retailers stored in the aggregated computer database with a predefined time period enabling displaying of returned goods information for each of the plurality of retailers for the predefined time period; and permit access to the associated returned goods information stored in the aggregated computer database by a corresponding one of the plurality of retailers for the displaying of the returned goods information.

13. The non-transitory computer readable medium of claim 12 wherein the instructions cause the processor to create the plurality of retailer databases each comprising store credit information, invoice information, item information, disposition information, and shipping information.

14. The non-transitory computer readable medium of claim 12 wherein the plurality of scheduled time periods comprises hourly.

* * * * *